United States Patent
Sugiyama

(10) Patent No.: US 8,050,717 B2
(45) Date of Patent: Nov. 1, 2011

(54) SIGNAL PROCESSING SYSTEM AND METHOD FOR CALIBRATING CHANNEL SIGNALS SUPPLIED FROM AN ARRAY OF SENSORS HAVING DIFFERENT OPERATING CHARACTERISTICS

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 558 days.

(21) Appl. No.: 11/514,204

(22) Filed: Sep. 1, 2006

(65) Prior Publication Data

US 2007/0053455 A1 Mar. 8, 2007

(30) Foreign Application Priority Data

Sep. 2, 2005 (JP) ................. 2005-255158

(51) Int. Cl.
*H04B 1/38* (2006.01)
*H04R 3/00* (2006.01)
*G01R 1/02* (2006.01)
*G06E 1/00* (2006.01)

(52) U.S. Cl. .......... 455/561; 381/92; 381/122; 324/130; 706/24; 455/570

(58) Field of Classification Search .................... 381/92, 381/122; 375/229; 324/130; 706/24; 455/570
See application file for complete search history.

(56) References Cited

U.S. PATENT DOCUMENTS

| | | | |
|---|---|---|---|
| 6,549,627 B1 | 4/2003 | Rasmusson et al. | |
| 2003/0076965 A1 | 4/2003 | Janse et al. | |
| 2004/0165735 A1 | 8/2004 | Opitz | |
| 2005/0018861 A1* | 1/2005 | Tashev | 381/92 |
| 2005/0276423 A1 | 12/2005 | Aubauer et al. | |
| 2006/0032357 A1 | 2/2006 | Roovers et al. | |

FOREIGN PATENT DOCUMENTS

| | | |
|---|---|---|
| JP | 5-111090 A | 4/1993 |
| JP | 7-131886 A | 5/1995 |
| JP | 11-52977 A | 2/1999 |
| JP | 2002-502193 A | 1/2002 |
| JP | 2002-99297 A | 4/2002 |
| JP | 3337671 | 8/2002 |
| JP | 2002-540696 A | 11/2002 |
| JP | 2004-502367 A | 1/2004 |

(Continued)

OTHER PUBLICATIONS

G.L. Fudge et al., "A Calibrated Generalized Sidelobe Canceller for Wideband Beamforming," IEEE Transactions of Signal Processing, vol. 42:10, Oct. 1994, pp. 2871-2875.

(Continued)

*Primary Examiner* — Kamran Afshar
*Assistant Examiner* — Omoniyi Obayanju
(74) *Attorney, Agent, or Firm* — Foley & Lardner LLP

(57) ABSTRACT

In a signal processing system, a set of channel signals from an array of sensors of different operating characteristics are processed in calibration circuitry that calculates individual average values of the channel signals and calculates an average of the individual average values of channel signals as a reference value. Reciprocal calculators calculate reciprocal values of the individual average values of the channel signals. Scaling circuitry scales the reciprocal values by the reference value to produce a set of amplitude calibration signals and scales the channel signals by the calibration signals respectively. As a result, the channel signals are normalized by their own average values and scaled by the reference value to produce a set of calibrated channel signals.

28 Claims, 12 Drawing Sheets

FOREIGN PATENT DOCUMENTS

| | | |
|---|---|---|
| JP | 2004-343700 A | 12/2004 |
| JP | 2005-538633 A | 12/2005 |

OTHER PUBLICATIONS

O. Hoshuyama et al., "Robust Adaptive Beamforming," Microphone Arrays, Springer 2001, pp. 87-109.

N. K. Jablon, Adaptive Beamforming with the Generalized Sidelobe Canceller in the Presence of Array Imperfections, IEEE Transactions on Antennas and Propagation, vol. 34:8, Aug. 1986, pp. 996-1012.

Osamu Hoshuyama et al., A Robust Adaptive Beamformer for Microphone Arrays with a Blocking Matrix Using Constrained Adaptive Filters, IEEE Transaction on Signal Processing, vol. 47, No. 10, Oct. 1999, pp. 2677-2684.

* cited by examiner

MULTI-CHANNEL EQUALIZER 700

GAIN CALCULATOR 710

SUBBAND MULTI-CHANNEL EQUALIZER 800-1

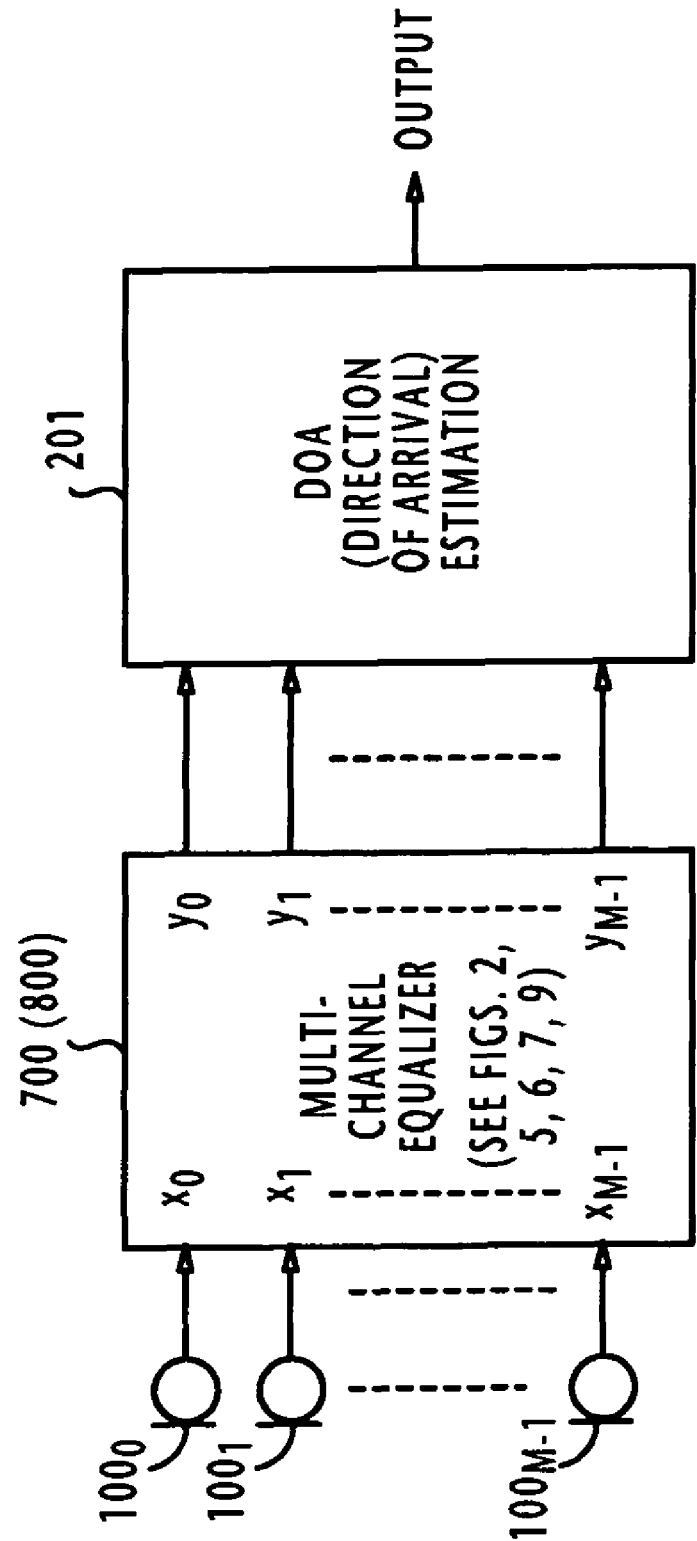

SIGNAL PROCESSING SYSTEM AND METHOD FOR CALIBRATING CHANNEL SIGNALS SUPPLIED FROM AN ARRAY OF SENSORS HAVING DIFFERENT OPERATING CHARACTERISTICS

BACKGROUND OF THE INVENTION

1. Field of the Invention

The present invention relates to a signal processing system for calibrating multiple channel signals from an array of sensors, such as microphones and antennas, having different operating characteristics.

2. Description of the Related Art

It is well known to use an array of sensors, such as microphones and radio antennas equally spaced at predetermined intervals and oriented in a specified direction for cancelling interference signals by forming a beam in the direction of arrival of a target signal. When microphones are used as the array sensors, the Griffiths-Jim beamformer is the basic technique also known as a generalized sidelobe canceller. In the Griffiths-Jim beamformer as described in a literature "Microphone Arrays", Springer, 2001, pages 87 to 109, signals from the microphone array are combined in a fixed beamformer to enhance a desired signal and attenuate interference signals. The array beam is formed by the fixed beamformer by linearly summing the microphone signals. If all microphones have the same operating characteristic, the summation results in an output that is M times the magnitude of each microphone signal (where M is the number of microphones). Hence the signals that arrive perpendicularly to the array surface (i.e., broadside signals) can be constructively combined. Since signals arriving in other directions have timing (phase) differences from the broadside signals, they interact with each other in a destructive manner. As a result, if the signals arriving perpendicularly to the array surface are the target signal, the target signal is enhanced, and the microphone array produces a directivity in a direction normal to its surface.

The microphone signals are also applied to a blocking matrix where these signals are combined to obtain multiple interference references. The enhanced target signal is delayed for an interval corresponding to the time taken by the blocking matrix to perform the matrix calculation. The delayed beamformer output and the interference references are combined in a multi-channel canceller. In the multi-channel canceller the interference references are used as interference replicas for subtraction from the enhanced target signal to produce an enhanced target signal.

However, if the operating characteristics of the microphones are not equal to each other due to their variation, the microphone signals partially interact with each other in a destructive way. This results in the array producing a degraded directivity in the direction normal to its surface. A similar problem occurs in the blocking matrix. In this case, it is the target signal that finds a leakage path to the outputs of the blocking matrix. This results in the multi-channel canceller performing partial cancellation of the target signal and causes a distortion in its output signal.

The element imperfection problem, caused by the above-mentioned variation, is addressed by a calibration technique described in IEEE Transactions on Signal Processing, Vol. 42, No. 10, pages 2871-2875, October 1994. According to this technique, a blocking matrix is designed based on optimal eigenvector constraints by using a broadband signal and a fixed beamformer corresponding to the blocking matrix is then designed. However, the use of broadband signal requires that individual calibration is necessary for each microphone array in advance of its manufacture. This is disadvantageous for quantity production.

Another calibration technique, as described in IEEE Transactions on Antennas and Propagations, Vol. 34, No. 8, pages 996-1012, August 1986, introduces noise at an appropriate level to each microphone signal. However, this prior art requires precision setting of the added noise level. Data such as signal-to-noise ratios, interference-to-signal ratios and the level of noise at each microphone must be additionally calculated on a real-time basis. The amount of computations is substantial and the additive noise is a potential source of poor sound quality. Further calibration techniques are disclosed in a number of patent publications. Japanese Patent Publication 2004-343700 discloses a technique that uses a calibration speaker and a signal processing system and Japanese Patent 3337671 teaches the use of a calibration microphone. Japanese Patent Publication 2002-502193 employs multiple adaptive filters for respective microphones. However, these prior art techniques require separate devices that present an increase in hardware. According to a further technique disclosed in Japanese Patent Publication 2004-502367, the output of a single microphone is used as a reference level. However, this reference level must be supplied from an external source.

SUMMARY OF THE INVENTION

It is therefore an object of the present invention to provide a calibration system and method for an array of sensors having different operating characteristics, which uses only input signals to perform calibration without advance calibration and additional computations and hardware.

According to a first aspect of the present invention, there is provided a signal processing system for processing a plurality of channel signals supplied from an array of sensors of different operating characteristics, comprising calibration circuitry that determines a reference value from the channel signals, equally splits the channel signals into first copies of the channel signals and second copies of the channel signals, and produces calibrated channel signals that are equal to the first copies normalized respectively by average values of the second copies and scaled by the reference value.

According to a second aspect, the present invention provides a signal processing system for processing a plurality of channel signals supplied from an array of sensors of different operating characteristics, comprising a plurality of analysis filter banks that respectively receive the channel signals from the sensors, wherein each analysis filter bank decomposes the received channel signal into a plurality of subband-channel signals of different frequencies, a plurality of multi-channel equalizers corresponding in number to the subband-channel signals decomposed by each analysis filter bank, wherein each multi-channel equalizer receives a plurality of subband-channel signals of same frequency from all of the analysis filter banks and produces a plurality of calibrated subband-channel signals, and a plurality of synthesis filter banks that respectively receive the calibrated subband-channel signals of different frequencies from all of the multi-channel equalizers, wherein each synthesis filter bank composes the calibrated subband-channel signals into a calibrated channel signal. Each of the multi-channel equalizers comprises calibration circuitry that determines a reference value from the received subband-channel signals, equally splits the subband-channel signals into first copies of subband-channel signals and second copies of subband-channel signals, and produces calibrated subband-channel signals that are equal to the first copies normalized respectively by average values of the second copies and scaled by said reference value.

According to a third aspect, the present invention provides a signal processing system processing a plurality of channel signals supplied from an array of sensors of different operating characteristics, comprising: a plurality of transform circuits that respectively receive the channel signals from the sensors, wherein each transform circuit transforms the received channel signal to a frequency-domain signal having amplitudes and phases of a plurality of different frequency components of the received channel signal, and a plurality of multi-channel equalizers corresponding in number to different frequency components of the frequency-domain signal transformed by each transform circuit, wherein each multi-channel equalizer receives a plurality of same frequency components of the frequency-domain signals from all of the transform circuits and produces a plurality of calibrated same frequency components of a frequency-domain signals. Each of the multi-channel equalizers comprises calibration circuitry that determines a reference value from the received same frequency components, equally splits the same frequency components into first copies of the same frequency components and second copies of the same frequency components, and produces calibrated same frequency components that are equal to the first copies normalized respectively by average values of the second copies and scaled by said reference value.

According to a fourth aspect, the present invention provides a method of processing a plurality of channel signals supplied from an array of sensors of different operating characteristics, comprising the step of calibrating the channel signals by determining a reference value from the channel signals, equally splitting the channel signals into first copies of the channel signals and second copies of the channel signals, and producing calibrated channel signals that are equal to the first copies normalized respectively by average values of the second copies and scaled by said reference value.

According to a fifth aspect, the present invention provides a method of processing a plurality of channel signals supplied from an array of sensors of different operating characteristics, comprising (a) decomposing each of the channel signals into a plurality of subband-channel signals of different frequencies, (b) calibrating same frequency subband-channel signals of each of the channel signals by determining a reference value from the same frequency subband-channel signals, equally splitting the subband-channel signals into first copies of the same frequency subband-channel signals and second copies of the same frequency subband-channel signals, and producing calibrated subband-channel signals that are equal to the first copies normalized respectively by average values of the second copies and scaled by said reference value, and (c) composing calibrated subband-channel signals of different frequencies into a plurality of calibrated channel signals.

According to a sixth aspect, the present invention provides a method of processing a plurality of channel signals supplied from an array of sensors of different operating characteristics, comprising (a) transforming each of the channel signals from the sensors to a frequency-domain signal having amplitudes and phases of a plurality of different frequency components, and (b) calibrating same frequency components of each of the frequency-domain signals by determining a reference value from the same frequency components, equally splitting the same frequency components into first copies of the same frequency components and second copies of the same frequency components, and producing calibrated same frequency components that are equal to the first copies normalized respectively by average values of the second copies and scaled by said reference value.

BRIEF DESCRIPTION OF THE DRAWINGS

The present invention will be described in detail with reference to the following drawings, in which:

FIG. 12 is a block diagram of a signal processing system according to a fourth embodiment of the present invention.

DETAILED DESCRIPTION

Figure 1:
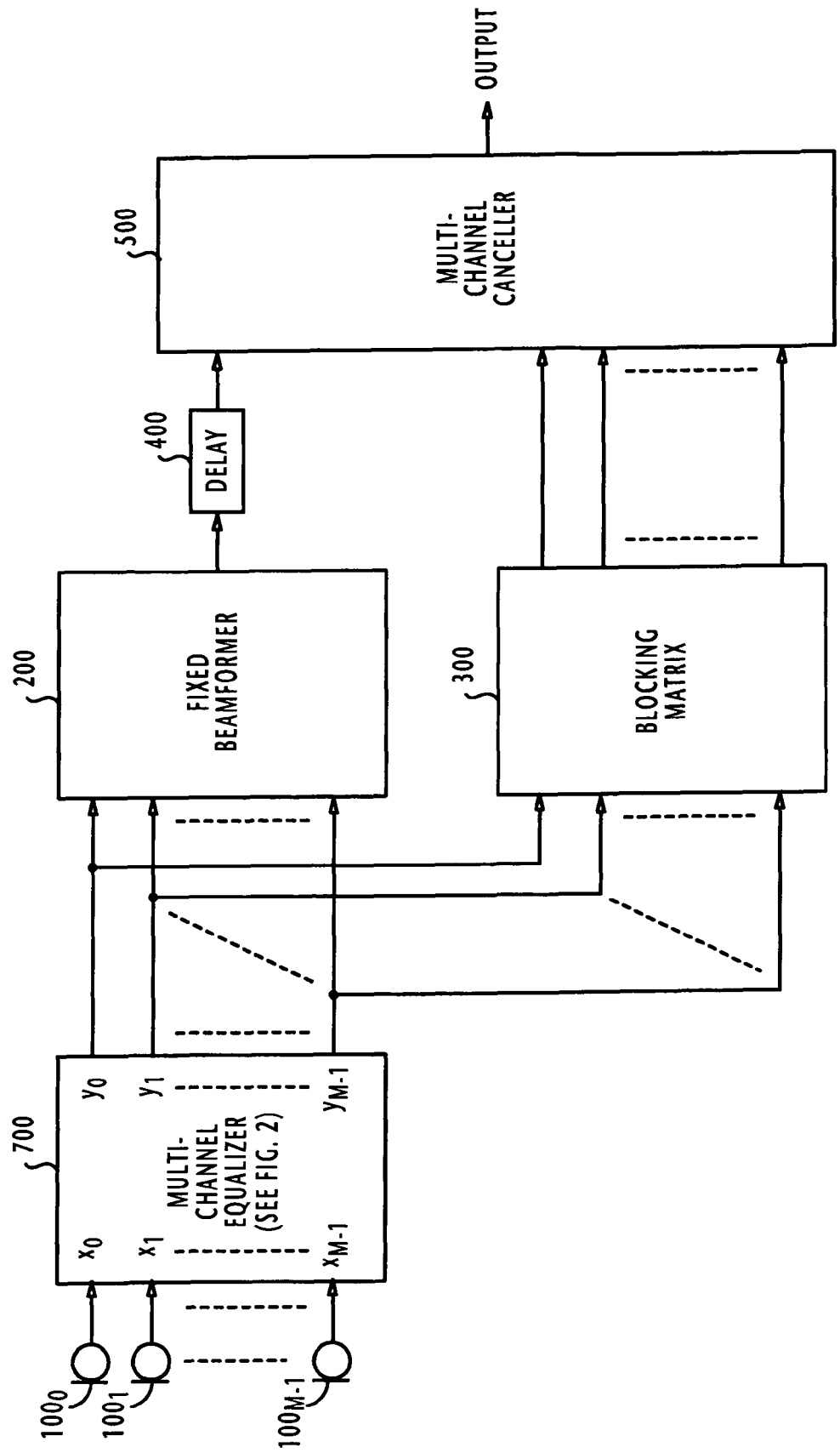
FIG. 1 is a block diagram of a signal processing system of a first embodiment of the present invention for an array of microphones.

In FIG. 1, there is shown a signal processing system according to a first embodiment of the present invention for an array of sensors that are equi-spaced at predetermined intervals along the surface of the array. For the purpose of disclosure, an array of microphones $100_0$~$100_{M-1}$ are used as sensors. A fixed beamformer 200, a blocking matrix 300 and a multi-channel canceller 500 are provided in the same manner as the corresponding elements of the Griffiths-Jim Beamformer described previously.

According to the present invention, a multi-channel equalizer 700 is provided to process microphone (or channel) signals from the array. Multi-channel equalizer 700 receives the input channel signals $x_0$~$x_{M-1}$ from microphones $100_0$~$100_{M-1}$ and produces calibrated microphone signals $y_0$~$y_{M-1}$ which are supplied to the fixed beamformer 200 and the blocking matrix 300.

In the beamformer, the calibrated microphone signals are linearly summed together to produce an enhanced target signal. The enhanced target signal is in a delay circuit 400 and supplied to the multi-channel canceller 500.

As described below, the microphone signals are processed in the equalizer 700 in such a manner that they behave as if they were produced by calibrated microphones. Therefore, the summation in the beamformer 200 results in an output that is exactly M times the magnitude of each microphone signal. Hence the signals that arrive perpendicularly to the surface of the array are constructively combined and signals arriving in other directions are destructively combined. As a result, if the surface of the array is normal to the arriving direction of a target signal, the signals arriving in that direction are constructively combined and an enhanced target signal is produced at the output of the fixed beamformer 200.

Blocking matrix 300 produces multiple interference references from the calibrated microphone signals. In the multi-channel canceller, the interference references are used as interference replicas for subtraction from the enhanced target signal to produce an enhanced target signal.

Figure 2:
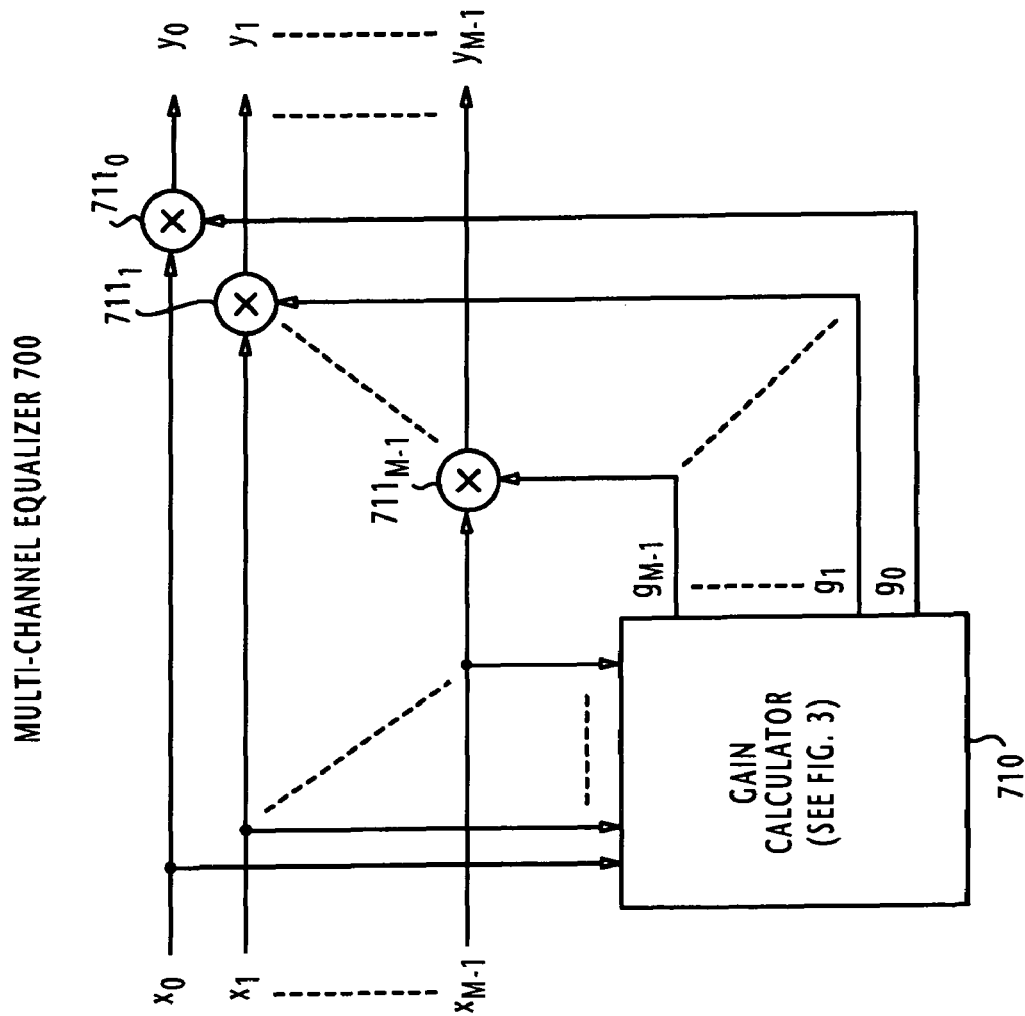
FIG. 2 is a block diagram of the multi-channel equalizer of FIG. 1.

FIG. 2 illustrates the details of the multi-channel equalizer 700. Equalizer 700 comprises a gain calculator 710 and a plurality of multiplator $711_0 \sim 711_{M-1}$. Microphone signals $x_0 \sim x_{M-1}$ from the array are equally split into first copies of the channel signals and second copies of the channel signals. The first copies of the channel signals are respectively supplied to the multiplator 711 and the second copies of the channel signals are supplied to the gain calculator 710. Gain calculator 710 produces a plurality of gains $g_0 \sim g_{M-1}$, which are supplied respectively to the multipliers $711_0 \sim 711_{M-1}$. The calibrated channel signals $y_0 \sim y_{M-1}$ are produced in the multiplator $711_0 \sim 711_{M-1}$ by respectively scaling the first channel signals $x_0 \sim x_{M-1}$ by the gains $g_0 \sim g_{M-1}$.

Figure 3:
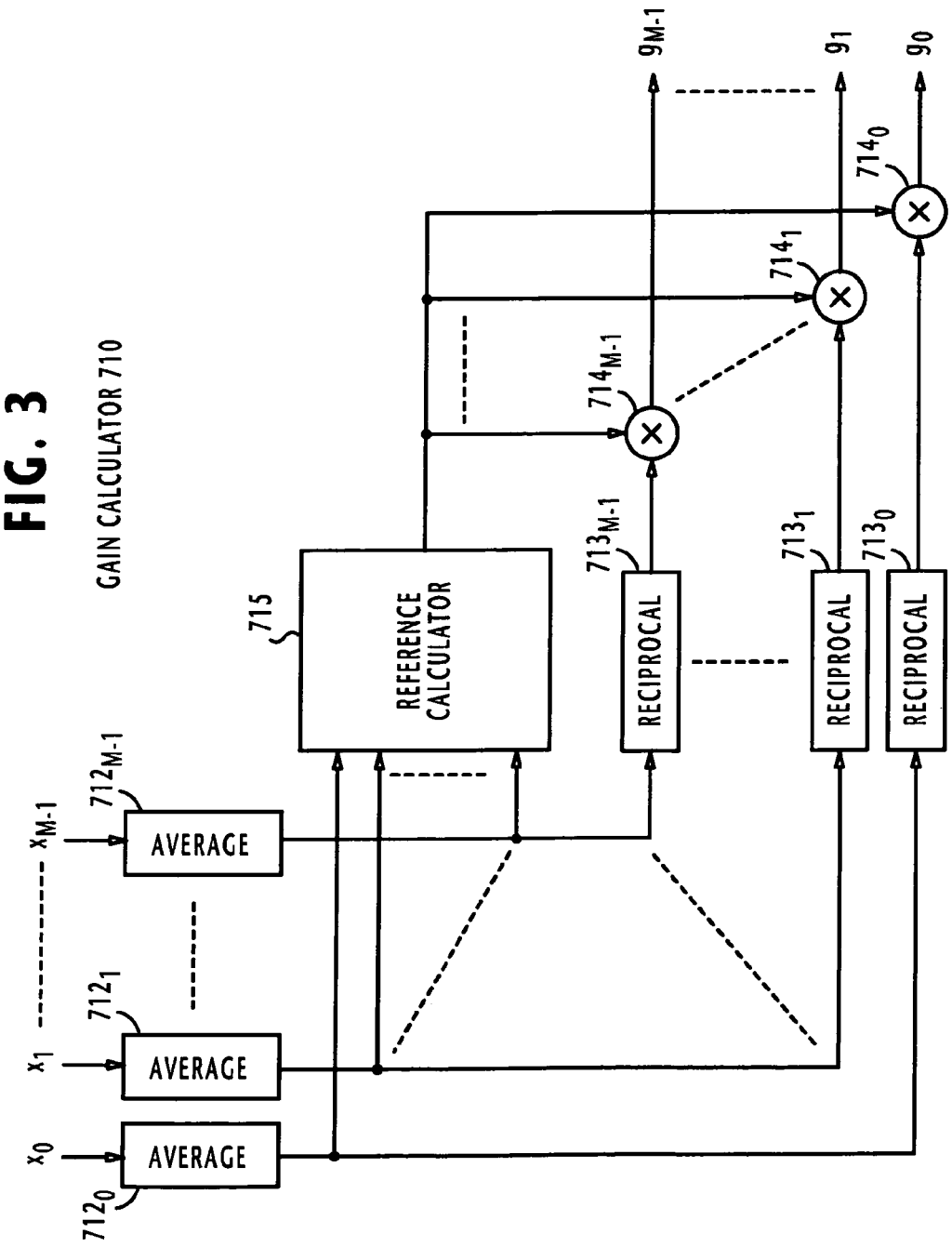
FIG. 3 is a block diagram of the gain calculator of FIG. 2.

As shown in FIG. 3, the gain calculator 710 is comprised of a plurality of average calculators $712_0 \sim 712_{M-1}$ connected respectively to the microphones $100_0 \sim 100_{M-1}$ to receive the second channel signals and produce individual average values $\bar{x}_0 \sim \bar{x}_{M-1}$ of the microphone signals $x_0 \sim x_{M-1}$. One averaging method is based on a sliding-window-based smoothing calculation known in the signal processing art as finite impulse response filters. If an L-tap (sample) sliding widow is used, the average power of each channel signal is obtained as follows:

$$\bar{x}_k^2 = \frac{1}{L} \sum_{j=k-L+1}^{k} x_j^2 \qquad (1)$$

where k is an index representing the current time.

Another averaging method involves the use of a first order leaky integrator, which yields the following average value:

$$\bar{x}_k^2 = \beta \cdot \bar{x}_{k-1}^2 + (1-\beta) \cdot x_k^2 \qquad (2)$$

where $\beta$ is a constant and satisfies the relation $0<\beta<1$. Note that if the microphone signals contain speech, it is preferable to set the integer L equal to a sample value that corresponds to a period of 2 to 3 seconds and set the constant $\beta$ so that it corresponds to L.

The average values $\bar{x}_0 \sim \bar{x}_{M-1}$ are supplied to reciprocal calculators $713_0 \sim 713_{M-1}$. Reciprocal calculators $713_0 \sim 713_{M-1}$ calculate the reciprocals of the average values $\bar{x}_0 \sim \bar{x}_{M-1}$ and then calculate their square roots as follows and supply them to multiplator $714_0 \sim 714_{M-1}$.

$$\sqrt{\frac{1}{\bar{x}_0^2}}, \sqrt{\frac{1}{\bar{x}_1^2}}, \ldots, \sqrt{\frac{1}{\bar{x}_{M-1}^2}} \qquad (3)$$

The average values $\bar{x}_0 \sim \bar{x}_{M-1}$ of the microphone signals are also supplied to a reference calculator 715, which produces a reference (average) value $s_0$ of the individual average values of the channel signals by calculating the following Equation:

$$s_0 = \frac{\sqrt{\sum_{j=0}^{M-1} \bar{x}_j^2}}{\sqrt{M}} \qquad (4)$$

The reference value $s_0$ is an average value of the individual average power values of all channels calculated by the average calculators 712. This average value $s_0$ is used in the multiplator $714_0 \sim 714_{M-1}$ to multiply the outputs of the reciprocal calculators $713_0 \sim 713_{M-1}$ to produce gain values $g_i$ (where i=0, 1, . . . , M-1) as follows:

$$g_i = \frac{1}{\sqrt{M}} \sqrt{\frac{\sum_{j=0}^{M-1} \bar{x}_j^2}{\bar{x}_i^2}} \qquad (5)$$

By multiplying the reciprocals of the individual average values of channel (microphone) signals by the reference value $s_0$, the gain (calibration) signal $g_i$ has the effect of normalizing the channel signals with their own average values and of calibrating the channel signals with the reference signal. Equation (5) indicates that the gain value for calibrating each channel signal can be easily obtained by simple calculations of average and square root of the channel signal. Therefore, the multi-channel equalizer 700 produces calibrated channel signals that are equal to the first copies of the channel signals normalized with the average values of the second copies and scaled by the reference signal jointly by the multiplator $711_0 \sim 711_{M-1}$ and multiplator $714_0 \sim 714_{M-1}$. As a result, the calibration can be made with a small amount of computations.

In FIG. 2, the calibration (gain) signals $g_0 \sim g_{M-1}$ are used in multipliers $711_0 \sim 711_{M-1}$ to scale the channel signals $x_0 \sim x_{M-1}$, respectively. As a result, the channel signals are calibrated in such a way that they behave as if they were generated by an array of sensors of equal operating characteristics.

Figure 4:
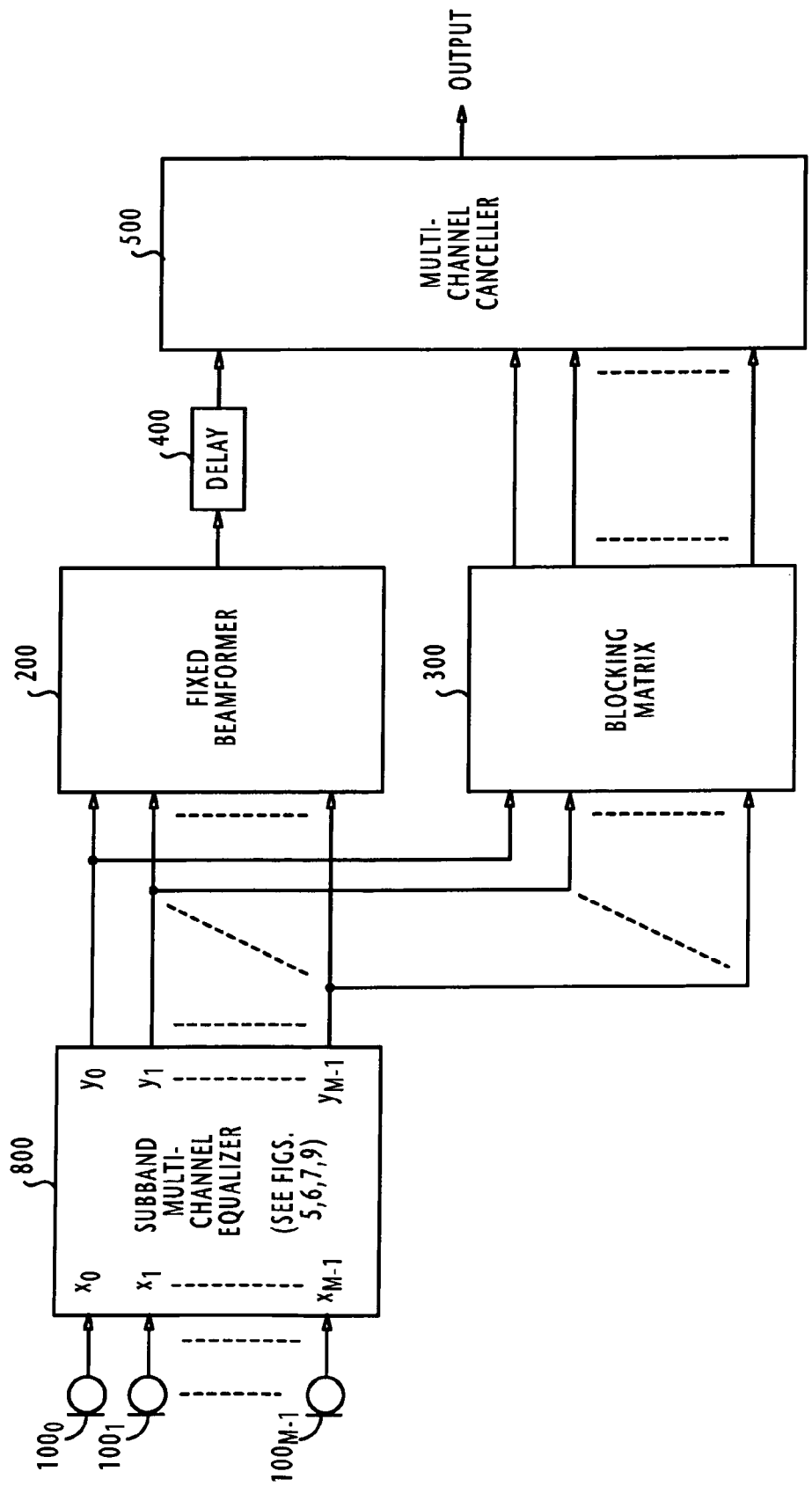
FIG. 4 is a block diagram of a signal processing system according to a second embodiment of the present invention.

FIG. 4 is a block diagram of a second embodiment of the present invention in which a subband multi-channel equalizer 800 is used instead of the multi-channel equalizer 700 of FIG. 1. In FIG. 4, parts corresponding to those of FIG. 1 bear the same numerals and the description thereof is omitted for simplicity.

Figure 5:
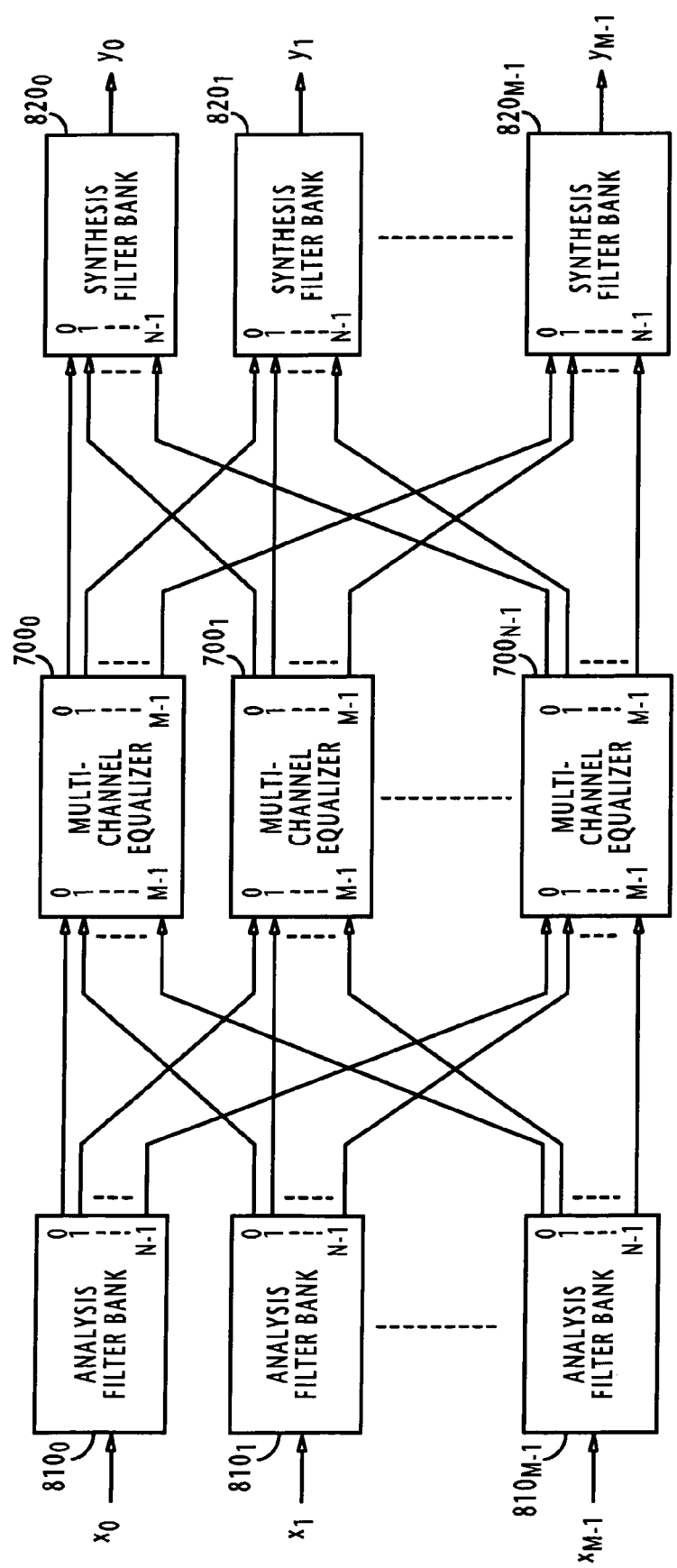
FIG. 5 is a block diagram of a first form of the subband multi-channel equalizer of FIG. 4.

As shown in detail in FIG. 5, the subband multi-channel equalizer 800-1 of FIG. 4 according to a first form of the present invention comprises M analysis filter banks $810_0 \sim 810_{M-1}$ which are respectively connected to the microphones $100_0 \sim 100_{M-1}$ to receive the channel signals $x_0 \sim x_{M-1}$. Each analysis filter bank $810_i$ decomposes the frequency spectrum of the corresponding channel signal $x_i$ into N subband-channel signals $x_{i,j}$ (where i=0, 1, . . . , M-1, j=0, 1, . . . , N-1) representing the different frequency components, or subbands of the channel signal $x_i$.

A plurality of multi-channel equalizers $700_0 \sim 700_{N-1}$ are provided corresponding in number to the N subband-channels decomposed by each analysis filter bank Each of these multi-channel equalizers $700_0 \sim 700_{N-1}$ is of identical configuration to that shown in FIG. 1 and provided with M input terminals corresponding in number to the M analysis filter banks 810.

All subband-channel signals of the analysis filter banks $810_0 \sim 810_{M-1}$ are supplied to the multi-channel equalizers $700_0 \sim 700_{N-1}$ in such a manner that the multi-channel equalizer $700_i$ receives M subband-channel signals $x_{i,0}, \ldots, x_{i,j}, \ldots, x_{i,M-1}$ of the same frequency band "i" from all analysis filter banks. Each multi-channel equalizer 700 equalizes its M subband-channel signals to produce M calibrated subband-channel signals in a manner identical to that described in connection with the previous embodiment.

A plurality of synthesis filter banks $820_0 \sim 820_{M-1}$ are provided, each having N input terminals. Synthesis filter bank $820_j$ receives M calibrated subband-channel signals of the different frequency components from all multi-channel equalizers $700_0$~$700_{N-1}$ to produce a calibrated channel signal $y_j$.

In the analysis filter banks, the spectrum of each channel signal may be divided into subband-channel of uniform subbands or nonuniform subbands. In the latter case, if the lower frequency range of the channel spectrum is divided into narrower bandwidths and the higher frequency range is divided into broader bandwidths, time-domain resolution can be low in the lower frequency range and high in the higher frequency range. As described in "Multirate Systems and Filter Banks, Prentice-Hall, 1993, pages 45-60, 188-393, 478-479, the channel spectrum may be divided according to octave division in which the bandwidth of each subband-channel is one-half of the bandwidth of its higher-frequency adjacent subband-channel. The channel spectrum may also be divided using the critical band which is based on the human hearing characteristics.

Figure 6:
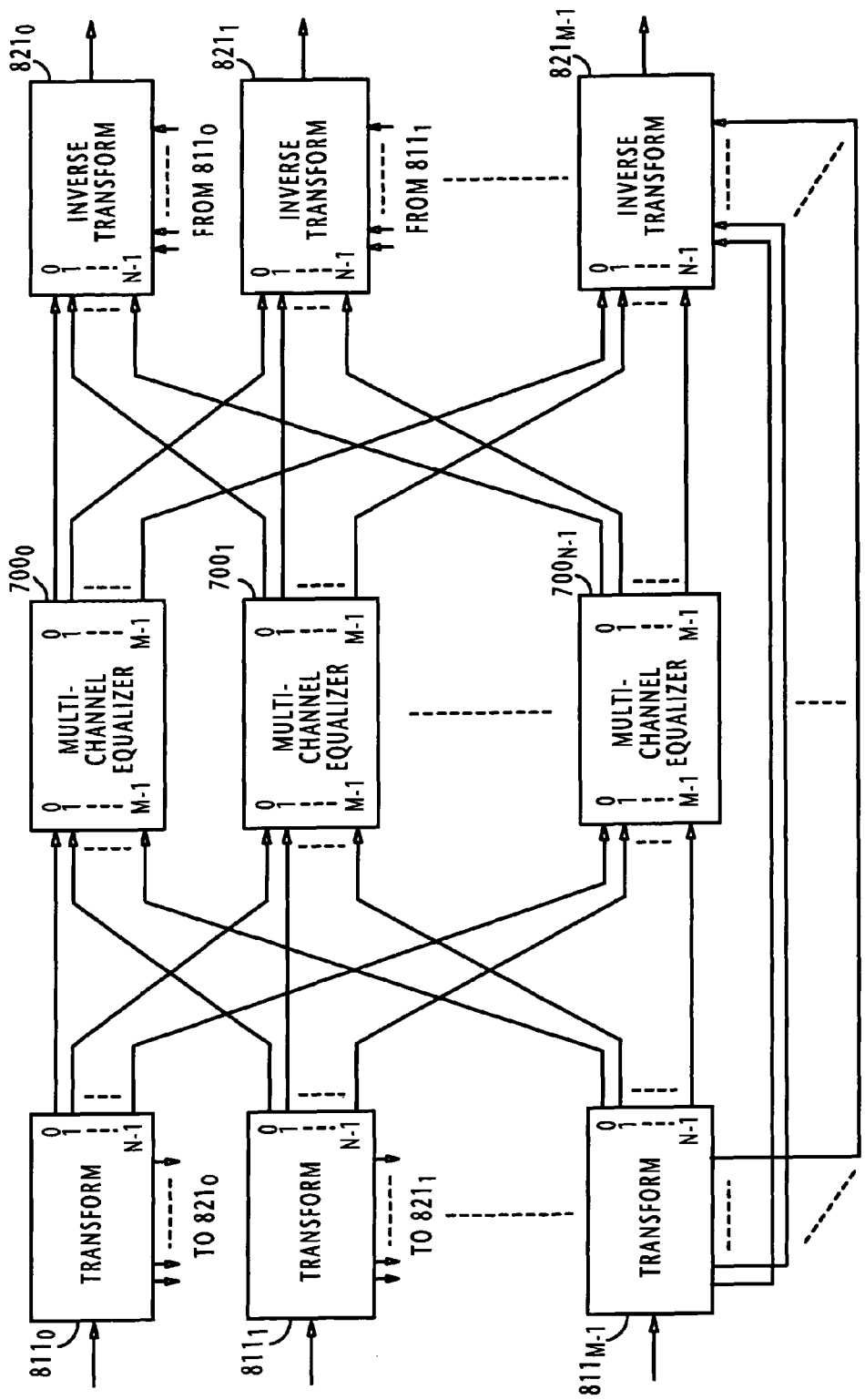
FIG. 6 is a block diagram of a second form of the frequency-domain multi-channel equalizer of FIG. 4.

FIG. 6 illustrates the subband multi-channel equalizer 800-2 of FIG. 4 according to a second form of the present invention, in which parts corresponding to those in FIG. 5 bear the same reference numerals. Instead of using analysis filter banks of FIG. 5, this embodiment uses frequency domain converters, or transform circuits $811_0$~$811_{M-1}$. Each transform circuit $811_i$ (where i=0, 1, . . . , M-1) transforms the output signal of the associated microphone to a frequency-domain signal which shows the amplitude and phase of different frequency components (i.e., sub-channels) $x_{j,0}$~$x_{j,N-1}$ of its input channel signal $x_j$. The amplitude information of the different frequency components are separated from the corresponding phase information.

Transform circuit $811_i$ supplies each one of its amplitude signals $x_{i,0}$~$X_{i,N-1}$ to a corresponding input terminal "j" of each of the N multi-channel equalizers $700_0$~$700_{N-1}$ so that the equalizer $700_j$ (where j=0, 1, . . . , N-1) receives amplitude signals $|x_{i,0}|$, . . . , $|x_{i,j}|$, . . . , $|x_{i,M-1}|$ of the same frequency component $x_i$ from all transform circuits 811. Multi-channel equalizer $700_j$ performs calibration (equalization) on the M input amplitude signals in the same way as described previously, and produces a set of M calibrated amplitude output signals that appear at output terminals "0" to "M-1".

Multi-channel equalizer $700_j$ supplies each one of its calibrated amplitude signals to a corresponding amplitude input terminal "j" of each of N-input time-domain converters, or inverse transform circuits $821_0$~$821_{M-1}$ so that the inverse transform circuit $821_i$ receives calibrated amplitude signals $|x_{i,0}|$, . . . , $|x_{i,j}|$, . . . , $|x_{i,N-1}|$ of all frequency components from the multi-channel equalizers $700_0$~$700_{N-1}$.

The phase information separated from the transform circuit $810_j$ is directly supplied to the inverse transform circuit $821_j$, to which M calibrated amplitude signals of different frequency components are also supplied from all multi-channel equalizers $700_0$~$700_{N-1}$. Using the phase signals, the inverse transform circuit $821_j$ combines the received amplitude signals to synthesize a frequency domain channel signal and performs inverse transform on the synthesized frequency domain signal to produce a calibrated time-domain channel signal $y_j$.

In a practical aspect, the transform circuits $811_0$~$811_{M-1}$ organize a plurality of input samples into a number of blocks and perform transform on each of the blocks. In a similar manner, the inverse transform circuits perform inverse transform on the same number of input samples. Examples of the transform are Fourier transform, cosine transform and Karhunen-Loeve transform. Details of these transforms are described in "Digital Coding of Waveforms, Principles and Applications to Speech and Video", Prentice-Hall, 1990, pages 510-563.

In a further aspect, a windowing technique may be used in the process of frequency domain conversion. In this case, the transform circuits $811_0$~$811_{M-1}$ multiply each block of input samples by a window function, such as Hamming, Hanning (or Han), Kaiser, or Blackman window, and perform the transform on the windowed input samples. Details of these window functions are described in literatures "Multirate Systems and Filter Banks", Prentice-Hall, 1993, pages 45-60, 188-393, 478-479, and "Digital Signal Processing", Prentice-Hall, 1975, pages 239-250.

In a still further aspect, the organized blocks of input samples may be partially overlapped with adjacent blocks. For example, if 30 percent of the block length is overlapped, the last 30 percent of a block is used as the first 30 percent of the next block. Corresponding to the way blocks of samples are partially overlapped in the transform circuits 811, the blocks are partially overlapped in the inverse transform circuits 821. Further information for overlapped transform is described in a literature "Digital Coding of Waveforms, Principles and Applications to Speech and Video", Prentice-Hall, 1990, pages 510-563.

Figure 7:
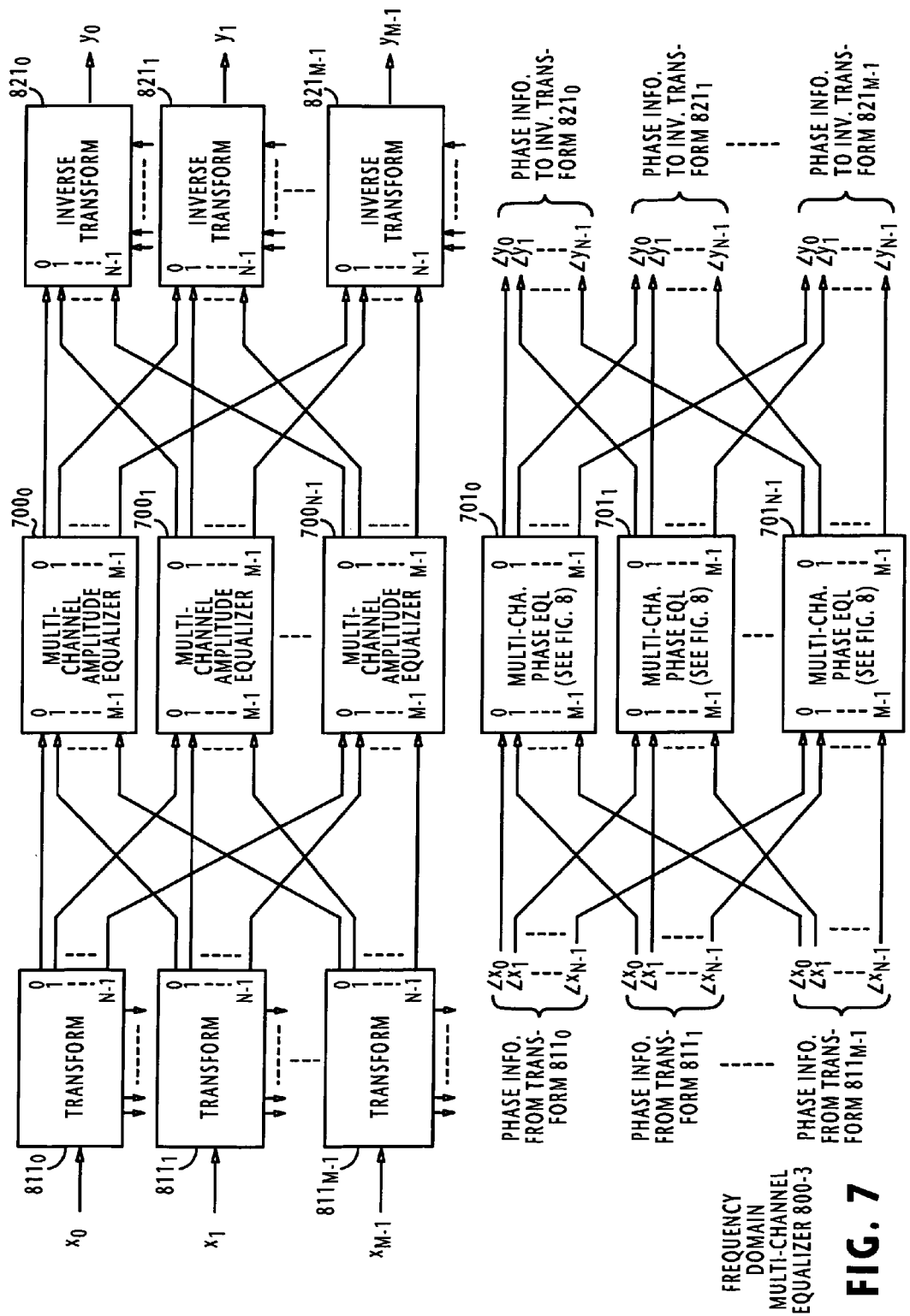
FIG. 7 is a block diagram of a third form of the frequency-domain multi-channel equalizer of FIG. 4.

FIG. 7 illustrates each frequency-domain multi-channel equalizer 800-3 of FIG. 4 according to a third form of the present invention, in which parts corresponding to those in FIG. 6 bear the same reference numerals. This embodiment differs from FIG. 6 in that a plurality of multi-channel phase equalizers $701_0$~$701_{M-1}$ are additionally provided corresponding to the multi-channel amplitude equalizers $700_0$~$700_{M-1}$ for equalizing the phase information of the corresponding amplitude of each frequency component.

Similar to the manner the multi-channel amplitude equalizers $700_0$~$700_{M-1}$ are connected between the amplitude output terminals of transform circuits $811_0$~$811_{M-1}$ and the amplitude input terminals of inverse transform circuits $821_0$~$821_{M-1}$, the multi-channel phase equalizers $701_0$~$701_{M-1}$ are connected between the phase output terminals of transform circuits $811_0$~$811_{M-1}$ and the phase input terminals of inverse transform circuits $821_0$~$821_{M-1}$. Therefore, the transform circuit $811_i$ (where i=0, 1, . . . , M-1) supplies the phase information of frequency components $x_{i,0}$~$x_{i,N-1}$ to a corresponding input terminal "j" of each of the N multi-channel phase equalizers $701_0$~$701_{N-1}$ so that the phase equalizer $701_j$ (where j=0, 1, . . . , N-1) receives phase signals $\angle x_{i,0}$, . . . , $\angle x_{i,j}$, . . . , $\angle x_{i,N-1}$ of the same frequency component $x_i$ from all transform circuits 811.

Multi-channel phase equalizer $701_j$ supplies each one of its calibrated phase signals to a corresponding phase input terminal "j" of each of N-input inverse transform circuits $821_0$~$821_{M-1}$ so that the inverse transform circuit $821_i$ receives calibrated phase signals $\angle y_{i,0}$, . . . , $\angle y_{i,j}$, . . . , $\angle y_{i,N-1}$ of all frequency components from the multi-channel phase equalizers $701_0$~$701_{N-1}$. Using the calibrated phase signals, the inverse transform circuit $821_j$ combines the received amplitude signals to synthesize a frequency-domain channel signal and performs inverse transform on the frequency domain signal to produce a calibrated time-domain channel signal $y_i$.

Figure 8:
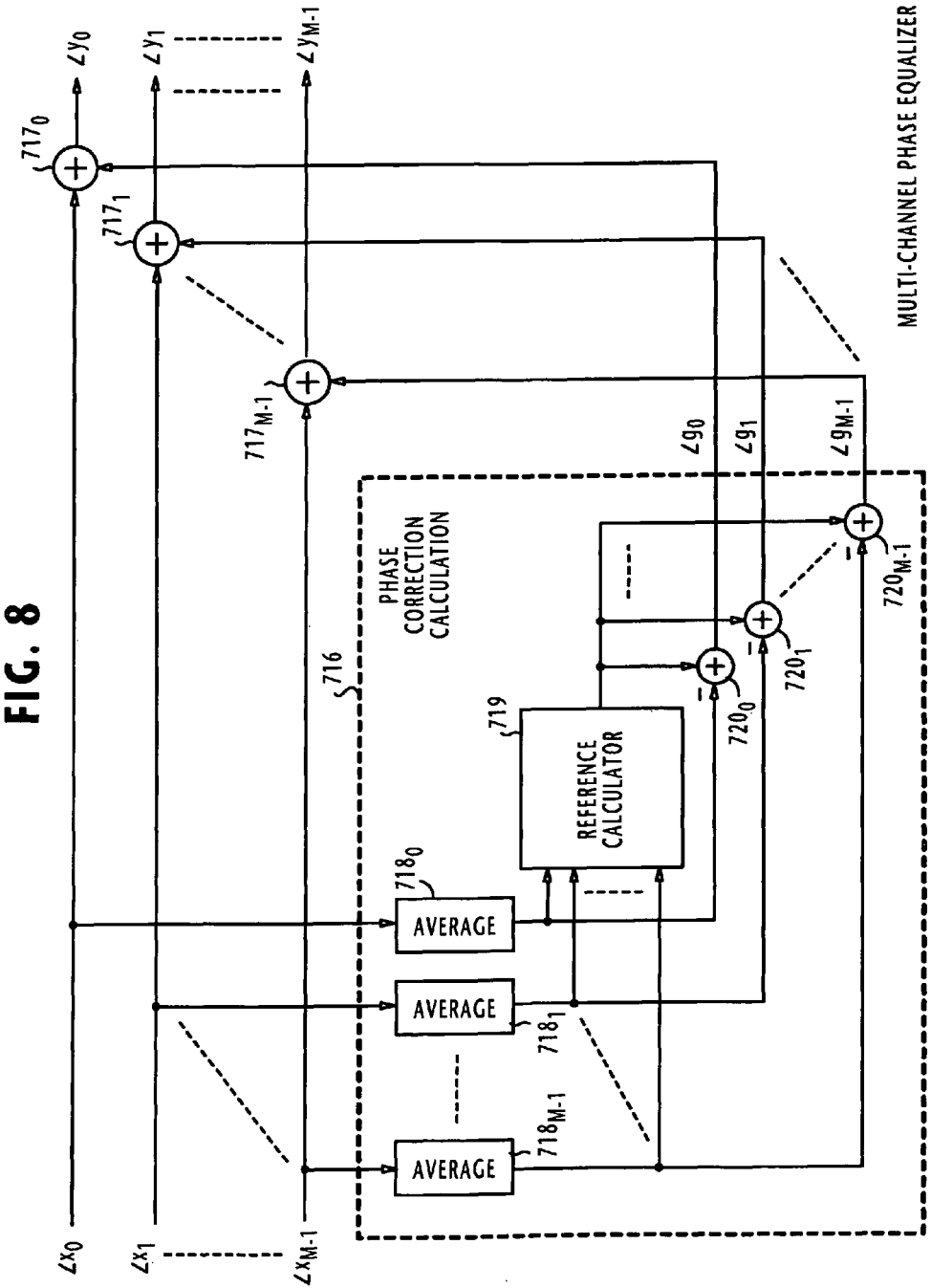
FIG. 8 is a block diagram of each multi-channel phase equalizer of FIG. 7.

As shown in FIG. 8, each of the multi-channel phase equalizers $701_0$~$701_{M-1}$ comprises a plurality of adders $717_0$~$717_{M-1}$ and a phase correction calculator 716 which includes a plurality of average phase angle calculators $718_0$~$718_{M-1}$. In the multi-channel phase equalizer $701_j$, the phase information signals $\angle x_0$~$\angle x_{M-1}$ of the same frequency component "j" are supplied from all transform circuits $811_0$~$811_{M-1}$ respectively to both adders $717_0$~$717_{M-1}$ and average phase angle calculators $718_0$~$718_{M-1}$. Average phase angle calculators $718_0$~$718_{M-1}$ produce average phase angle values $\angle\bar{x}_0, \ldots, \angle\bar{x}_{M-1}$, which are further averaged by a reference calculator 719 to produce a reference (average) phase angle value $\angle G_0$, which is given as follows:

$$\angle G_0 = \frac{\sum_{j=0}^{M-1} \angle\bar{x}_j}{M} \tag{6}$$

The average values $\angle\bar{x}_0, \ldots, \angle\bar{x}_{M-1}$ are respectively subtracted in subtractors $720_0$~$720_{M-1}$ from the reference value $\angle G_0$ to produce a set of phase correction values as given below:

$$\angle g_i = \angle G_0 - \angle\bar{x}_i \text{ (where } i=1, 0, \ldots, M-1) \tag{7}$$

The phase correction values $\angle g_0$~$\angle g_{M-1}$ are respectively combined in the adders $717_0$~$717_{M-1}$ with their input phase information signals $\angle x_0$~$\angle x_{M-1}$ to produce corrected phase information signals $\angle y_0$~$\angle y_{M-1}$ as given by Equation (8):

$$\angle y_i = \angle x_i + \angle g_i \tag{8}$$

As a result, when the phase correction values $\angle g_0$~$\angle g_{M-1}$ are used in the adders $717_0$~$717_{M-1}$ to shift the phase information signals $\angle x_0$~$\angle x_{M-1}$, the phase information signals $\angle y_0$~$\angle y_{M-1}$ are equally aligned (calibrated) in time with each other.

If the phase correction value $\angle g_i$ is negative, the minimum (i.e., maximum of the negative values) of a correction value $\angle \hat{g}_i$ (which is given below) is first determined and the correction value $\angle g_i$ is corrected so that the minimum value of the correction value $\angle \hat{g}_i$ is reduced to zero. Eventually, the correction value $\angle \hat{g}_i$ is expressed by Equation (9).

$$\angle \hat{g}_i = \angle g_i - \min\{\angle g_i\} \tag{9}$$

Figure 9:
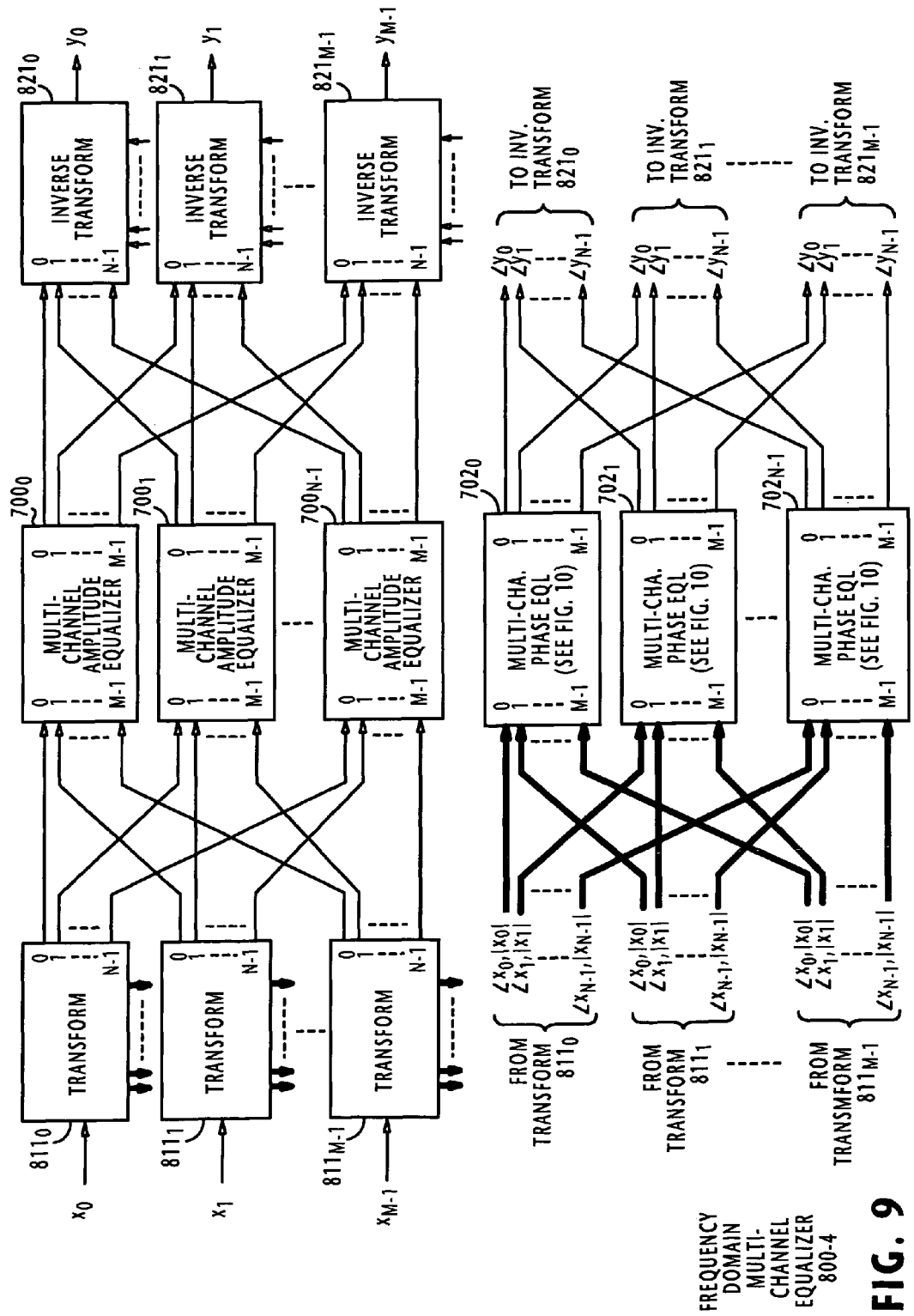
FIG. 9 is a block diagram of a fourth form of the frequency-domain multi-channel equalizer of FIG. 4.

A modified frequency-domain multi-channel equalizer 800-4 is shown in FIG. 9 which differs from the embodiment of FIG. 7 in that amplitude signals $|x_0|$~$|x_{M-1}|$ are also used in calibrating the phase information. Multi-channel phase equalizers $702_0$~$702_{N-1}$ receive the amplitude signals $|x_0|$~$|x_{M-1}|$ from the transform circuits $811_0$~$811_{M-1}$ along with the phase information signals $\angle x_0$~$\angle x_{M-1}$.

Figure 10:
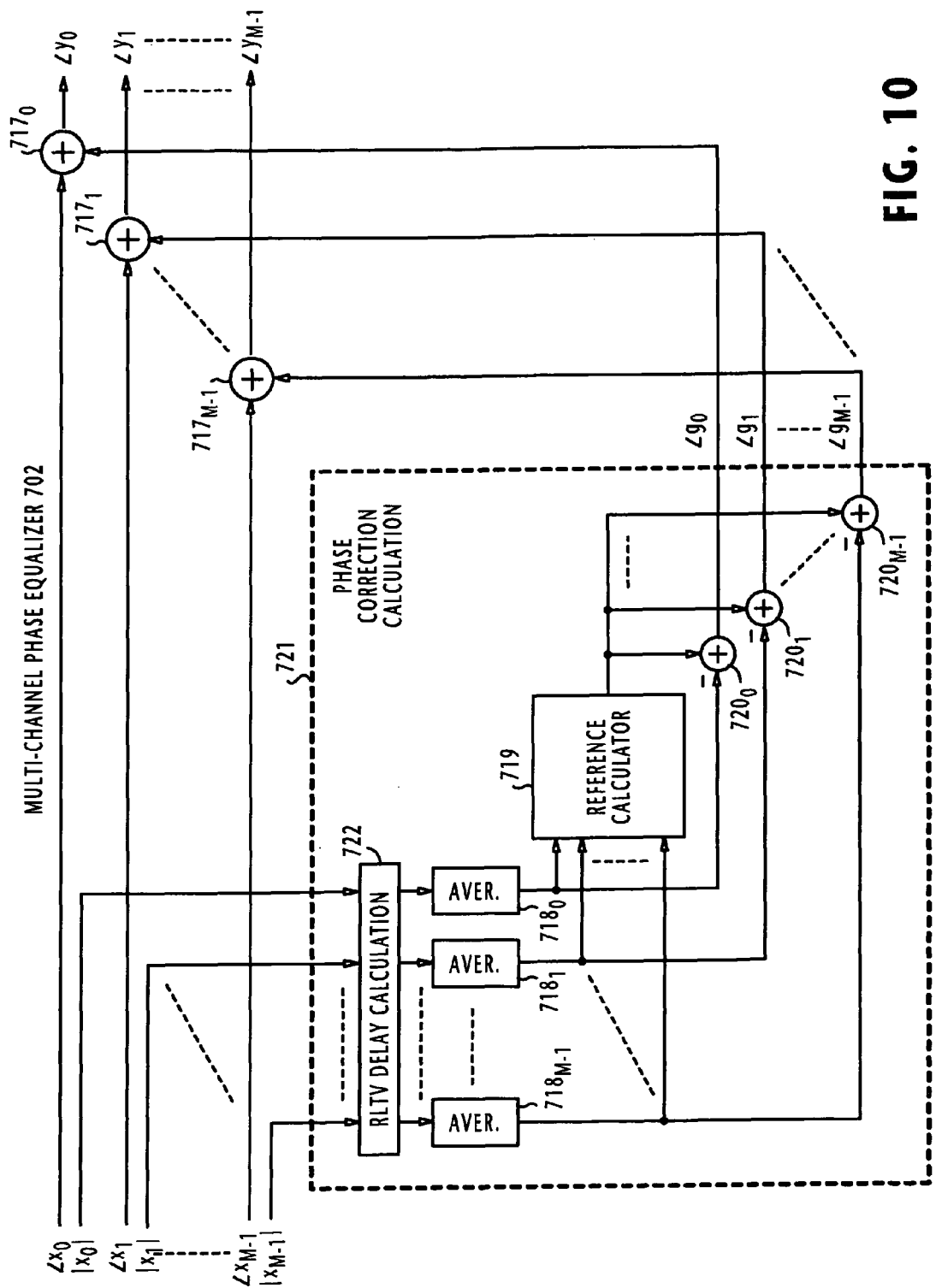
FIG. 10 is a block diagram of each multi-channel phase equalizer of FIG. 9.

As shown in FIG. 10, each multi-channel phase equalizer $702_j$ is similar to that shown in FIG. 8 with the exception that the amplitude signals $|x_0|$~$|x_{M-1}|$ are supplied to a phase correction calculator 721, while the phase signals are only supplied to the adders $717_0$~$717_{M-1}$.

Phase correction calculator 721 differs from the phase correction calculator 716 of FIG. 8 in that it additionally includes a relative delay calculator 722 to determine the delay time differences $\delta_0$~$\delta_{M-1}$ between the input amplitude signals and feeds the relative delay time values to the average calculators $718_0$~$718_{M-1}$ to calculate their average value $\bar{\delta}_i$. The outputs of average calculators 718 are supplied to the reference calculator 719 and the subtractors $720_0$~$720_{M-1}$. More specifically, in the relative delay calculator 721 the relative delay time of a given amplitude signal is determined by first selecting one of the input amplitude signals as a reference amplitude signal. Correlation between the given amplitude signal and the reference signal is then calculated. This correlation calculation is repeated by successively shifting the timing point of correlation until the calculated correlation increases to a maximum, whereupon the relative delay time of the given amplitude signal is determined.

Reference calculator 719 calculates the average value $\delta_0$ of the averaged relative delay time difference values as follows:

$$\delta_0 = \frac{\sum_{j=0}^{M-1} \bar{\delta}_j}{M} \tag{10}$$

The average delay time difference value $\delta_0$ is supplied to the subtractors $720_0$~$720_{M-1}$ to produce the phase correction values as given below:

$$\angle g_i = 2\pi f(\delta_0 - \delta_i) \text{ (where } i=0, 1, \ldots, M-1) \tag{11}$$

If $-\delta_i + \delta_0$ is negative, the minimum of $-\delta_i + \delta_0$ is first determined and the value $(-\delta_i + \delta_0)$ is corrected so that the minimum value equivalently corresponds to zero. Eventually, the correction value $\angle \hat{g}_i$ is expressed by Equation (9).

$$\angle \hat{g}_i = 2\pi f\{\delta_0 - \delta_i - \min(\delta_0 - \delta_i)\} \tag{12}$$

Figure 11:
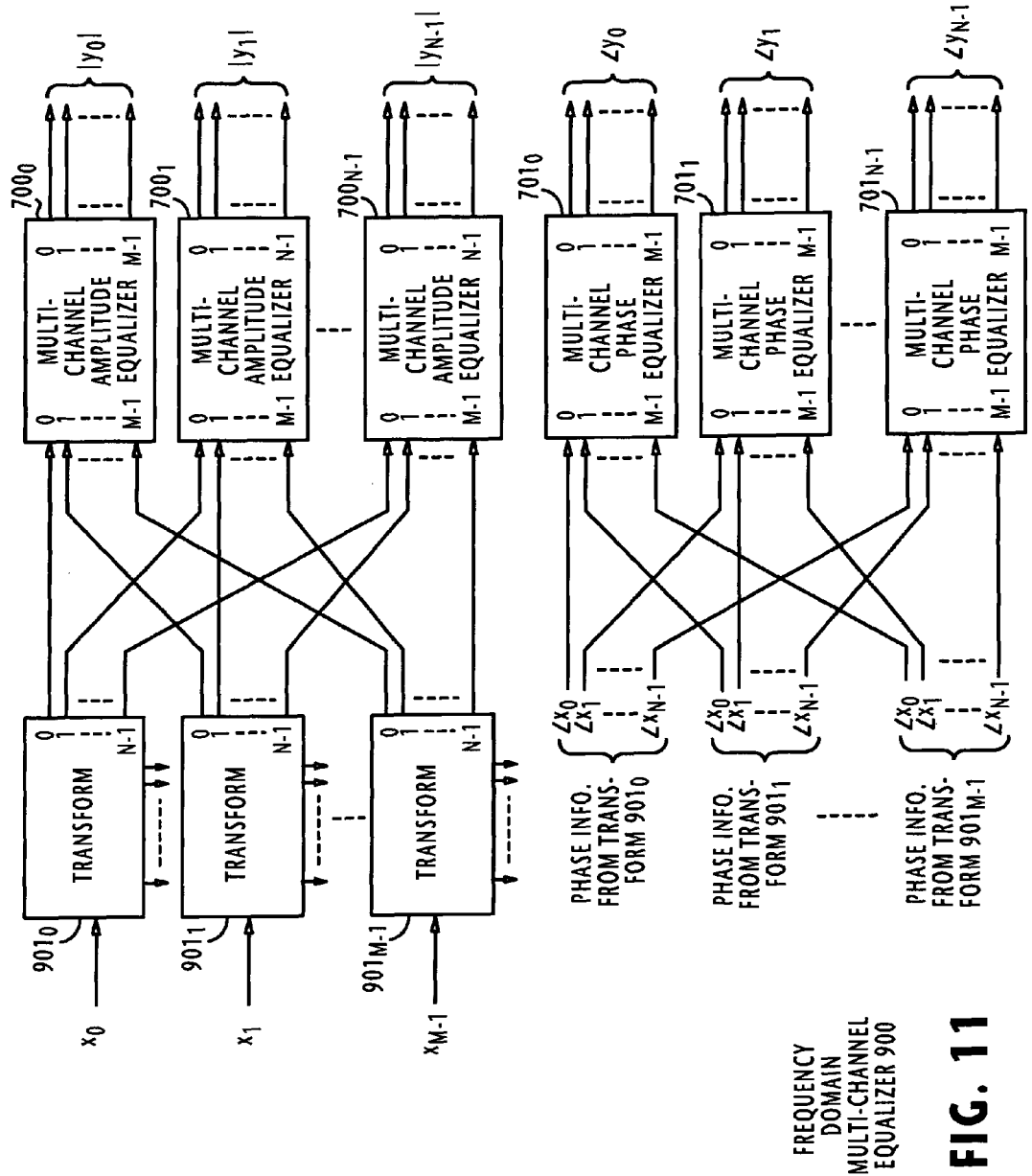
FIG. 11 is a block diagram of a signal processing system according to a third embodiment of the present invention.

In a further aspect of the present invention, a frequency-domain multi-channel equalizer 900 is shown in FIG. 11 as a modification of the frequency-domain multi-channel equalizers 800-3 and 800-4. In this modification, a transform domain adaptive filter can be used instead of the inverse transform circuits $821_0$~$821_{M-1}$.

Each of the transform circuitry $901_0$~$901_{M-1}$ generates a set of N frequency-domain signals $x_0$~$x_{N-1}$ and the multi-channel amplitude equalizers $700_0$~$700_{N-1}$ are provided in number corresponding to the number of amplitude signals generated by each of the transform circuits $901_0$~$901_{M-1}$. Likewise, the multi-channel phase equalizers $701_0$~$701_{N-1}$ or $702_0$~$702_{N-1}$ are provided in number corresponding to the number of phase information signals generated by each of the transform circuits $901_0$~$901_{M-1}$. The blocking matrix 300 described previously receives N calibrated amplitude signals $|y_0|$~$|y_{M-1}|$ and N calibrated phase signals $\angle y_0$~$\angle y_{M-1}$ to perform transform-domain adaptive filtering.

Note that the transform domain adaptive filters suitable for use in the present invention are described in a literature "Adaptive Filters", John Wiley & Sons, 1998, pages 201~292.

FIG. 12 shows a further modified embodiment of the present invention. In this modification, direction-of-arrival estimation circuitry 201 is provided instead of the fixed beamformer 200, blocking matrix 300, delay element 400 and multi-channel canceller 500. The DOA estimation circuitry 201 performs estimation of the arrival direction of incoming channel signals that are calibrated by the multi-channel equalizer 700 or 800 described in the previous embodiments. Based on the phase differences (relative delays) between the calibrated channel signals to determine in which direction the incoming signals are arriving according to the algorithm known in the art. Examples of the known algorithm are found in literatures "IEICE Transactions on Fundamentals", Vol. 87-A, No. 3, pages 559-566, March 2004, and "IEICE Transactions on Fundamentals", Vol. 88-A, No. 3, pages 633-641, March 2005.

Multi-channel equalizers 700 and 800 described above can be advantageously used in combination with the fixed beamformer 200, blocking matrix 300 and multi-channel canceller 500. By adaptively processing the calibrated channel signals supplied from the multi-channel equalizer, the fixed beamformer 200 forms a beam on signals arriving on the array of sensors. 100 in a predetermined direction, while the blocking matrix 300 forms a null on signals that arrive in other direction. Multi-channel canceller 500 that adaptively processes the channel signals by using the beam and the null respectively formed by the beamformer 200 and blocking matrix 300. Alternatively, a generalized sidelobe canceller is implemented with a combination of the fixed beamformer 200, the null forming circuitry, or blocking matrix 300 and the multichannel canceller 500.

What is claimed is:

1. A signal processing system for processing a plurality of channel signals supplied from an array of sensors of different operating characteristics, comprising calibration circuitry that determines a single reference signal common to all channel signals from said channel signals, generates first copies of said channel signals and second copies of said channel signals, and produces calibrated channel signals that are equal to said first copies normalized respectively by average values of said second copies and scaled by said reference signal.

2. The signal processing system of claim 1, wherein, said calibration circuitry comprises:
   reference calculation circuitry that calculates individual average values of said channel signals and determines said reference signal from said individual average values;
   reciprocal calculation circuitry that calculates reciprocal values of said individual average values; and
   scaling circuitry that scales said reciprocal values by said reference signal to produce a plurality of amplitude calibration signals and scales said channel signals by said calibration signals respectively.

3. The signal processing system of claim 2, wherein said reference signal is an average value of said individual average values.

4. The signal processing system of claim 3, wherein said individual average values are individual average power values of said channel signals and said average value of said individual average values is average power of said average power values.

5. The signal processing system of claim 1, further comprising:
   phase correction circuitry that calculates average phase angle values of phase information signals of said channel signals, and determines a reference phase angle value from said average phase angle values of channel signals; and
   phase shifting circuitry that phase shifts the average phase angle values of said phase information signals with said reference phase angle value to produce a plurality of phase calibration signals and phase shifts said phase information signals of channel signals with said phase calibration signals, respectively.

6. The signal processing system of claim 5, wherein said reference phase value is an average value of said phase angle values of channel signals.

7. The signal processing system of claim 1, further comprising:
   phase correction circuitry that determines relative delay time difference values between said channel signals and determines a reference delay time difference value from said relative delay time difference values; and
   phase shifting circuitry that phase shifts the relative delay time difference values with said reference delay time difference value to produce a plurality of phase calibration signals and phase shifts phase information signals of said channel signals with said phase calibration signals, respectively.

8. The signal processing system of claim 7, wherein said reference delay time difference value is an average value of said relative delay time difference values.

9. The signal processing system of claim 1, further comprising beamforming circuitry that fou ns a beam on signals arriving on said sensor array in a predetermined direction by using said calibrated channel signals from said calibration circuitry.

10. The signal processing system of claim 9, further comprising null forming circuitry that forms a null on signals arriving on said sensor array in a predetermined direction by using said calibrated channel signals from said calibration circuitry and a canceller that adaptively processes said channel signals by using said beam and said null.

11. The signal processing system of claim 9, wherein said beamforming circuitry adaptively performs the forming of said beam.

12. The signal processing system of claim 10, wherein said null forming circuitry adaptively performs the forming of said null.

13. The signal processing system of claim 10, wherein a combination of said beamforming circuitry, said null forming circuitry and said canceller is a generalized sidelobe canceller.

14. The signal processing system of claim 1, further comprising estimation circuitry for estimating the direction of arrival of signals on said array of sensors by using said calibrated channel signals.

15. A method of processing a plurality of channel signals supplied from an array of sensors of different operating characteristics, comprising the steps of calibrating said channel signals by determining a single reference signal common to all channel signals from said channel signals, generates first copies of the channel signals and second copies of the channel signals, and producing calibrated channel signals that are equal to said first copies normalized respectively by average values of said second copies and scaled by said reference signal.

16. The method of claim 15, wherein said calibrating step comprises the steps of:
   a) calculating individual average values of said channel signals and deteimining said reference signal from said individual average values;
   b) calculating reciprocal values of said individual average values; and
   c) scaling said reciprocal values by said reference signal to produce a plurality of amplitude calibration signals and scaling said channel signals by said calibration signals respectively.

17. The method of claim 16, wherein said reference signal is an average value of said individual average values.

18. The method of claim 16, wherein said individual average values are individual average power values of said channel signals and said average value of said individual average values is average power of said individual average power values.

19. The method of claim 15, further comprising:
   calculating average phase angle values of phase information signals of said channel signals;
   determining a reference phase angle value from said average phase angle values of channel signals;
   phase shifting the average phase angle values of said phase information signals with said reference phase angle value to produce a plurality of phase calibration signals; and
   phase shifting said phase information signals of channel signals with said phase calibration signals, respectively.

20. The method of claim 19, wherein said reference phase value is an average value of said phase angle values of channel signals.

21. The method of claim 15, further comprising:
determining relative delay time difference values between said channel signals and determining a reference delay time difference value from said relative delay time difference values;
phase shifting the relative delay time difference values with said reference delay time difference value to produce a plurality of phase calibration signals; and
phase shifting said phase information signals of channel signals with said phase calibration signals, respectively.

22. The method of claim 21, wherein said reference delay time difference value is an average value of said relative delay time difference values of channel signals.

23. The method of claim 15, further comprising the step of forming a beam on signals arriving on said sensor array in a predetermined direction by using the calibrated channel signals.

24. The method of claim 23, further comprising the step of forming a null on signals arriving on said sensor array in a predetermined direction by using the calibrated channel signals and adaptively processing said calibrated channel signals by using said beam and said null.

25. The method of claim 23, wherein the step of forming a beam adaptively performs the forming of said beam.

26. The method of claim 24, wherein said null forming step adaptively performs the forming of said null.

27. The method of claim 24 wherein a combination of said beamforming step, said null forming step and said adaptively processing step is performed by using a generalized sidelobe canceller.

28. The method of claim 15, further comprising estimating the arrival direction of signals on said array of sensors by using said calibrated channel signals.

* * * * *